(12) United States Patent
Sun et al.

(10) Patent No.: US 10,708,512 B2
(45) Date of Patent: Jul. 7, 2020

(54) METHOD AND DEVICE FOR CAPTURING IMAGE AND STORAGE MEDIUM

(71) Applicant: BEIJING XIAOMI MOBILE SOFTWARE CO., LTD., Beijing (CN)

(72) Inventors: Heng Sun, Beijing (CN); Zhehong Lin, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 15 days.

(21) Appl. No.: 16/198,746

(22) Filed: Nov. 21, 2018

(65) Prior Publication Data

US 2019/0174046 A1 Jun. 6, 2019

(30) Foreign Application Priority Data

Dec. 5, 2017 (CN) .......................... 2017 1 1270473

(51) Int. Cl.
*H04N 5/235* (2006.01)
*H04N 5/238* (2006.01)
*H04N 5/243* (2006.01)
*H04N 5/232* (2006.01)

(52) U.S. Cl.
CPC .......... *H04N 5/2353* (2013.01); *H04N 5/238* (2013.01); *H04N 5/2351* (2013.01); *H04N 5/2352* (2013.01); *H04N 5/23258* (2013.01); *H04N 5/243* (2013.01); *G03B 2207/005* (2013.01)

(58) Field of Classification Search
CPC ... H04N 5/23248–2329; H04N 5/2352; H04N 5/2353; H04N 5/238; H04N 5/243; G03B 2207/00–005
See application file for complete search history.

(56) References Cited

U.S. PATENT DOCUMENTS

| 2006/0170816 | A1  | 8/2006 | Silverstein et al. |
| 2015/0042828 | A1* | 2/2015 | Wakamatsu ....... H04N 5/23254 348/208.4 |
| 2016/0173749 | A1* | 6/2016 | Dallas ................. H04N 5/2352 348/208.6 |
| 2017/0187960 | A1  | 6/2017 | Tsuchiya |

FOREIGN PATENT DOCUMENTS

| CN | 104519282 A | 4/2015 |
| CN | 105516595 A | 4/2016 |
| EP | 3032821 A1  | 6/2016 |

OTHER PUBLICATIONS

Extended European Search Report dated Apr. 30, 2019 corresponding to European Application No. 18210479.4, (8p).
First Office Action issued to Chinese Patent Application No. 201711270473.3 from the Chinese Patent Office dated Sep. 3, 2019 with English translation, (13p).

* cited by examiner

*Primary Examiner* — Paul M Berardesca
(74) *Attorney, Agent, or Firm* — Arch & Lake LLP (57) ABSTRACT

The present disclosure relates to a method and a device for capturing an image and a computer readable storage medium. In the method, a current motion parameter of the terminal and a current ambient light parameter are acquired, a current exposure parameter of the terminal is set based on the current motion parameter of the terminal and the current ambient light parameter, and the image is captured based on the set current exposure parameter of the terminal. The exposure parameter includes a shutter value, an aperture value and a sensitivity.

20 Claims, 3 Drawing Sheets a current motion parameter of the terminal and a current ambient-light parameter are acquired — 101 a current exposure parameter of the terminal is set based on the current motion parameter of the terminal and the current ambient-light parameter — 102 the image is captured based on the set current exposure parameter of the terminal — 103

METHOD AND DEVICE FOR CAPTURING IMAGE AND STORAGE MEDIUM

CROSS REFERENCE TO RELATED APPLICATION

This application is based upon and claims a priority to Chinese Patent Application Serial No. 201711270473.3, filed with the State Intellectual Property Office of P. R. China on Dec. 5, 2017, the entire content of which is incorporated herein by reference in its entirety.

TECHNICAL FIELD

The present disclosure generally relates to a field of terminal technologies, and more particularly, to a method, a device and a storage medium for capturing an image.

BACKGROUND

Terminals such as smart phones and tablet computers may be configured with one or more cameras. The terminals may capture images through the one or more cameras configured thereon. When capturing the images, the terminals need to set an exposure parameter based on capturing surroundings to ensure quality of the captured images. The exposure parameter may include a shutter value, an aperture value and a sensitivity. After setting the exposure parameter, the terminals may capture the images based on the set exposure parameter.

SUMMARY

The present disclosure provides a method and a device and a computer readable storage medium for capturing an image.

According to a first aspect of the present disclosure, a method for capturing an image is provided. The method may be applied to a terminal and the method may include: acquiring a current motion parameter of the terminal and a current ambient light parameter; setting a current exposure parameter of the terminal based on the current motion parameter of the terminal and the current ambient light parameter, where the current motion parameter may indicate a motion state of the terminal, the current ambient light parameter may indicate a current ambient light intensity, and the current exposure parameter may include a shutter value, an aperture value and a sensitivity; and capturing the image based on the set current exposure parameter of the terminal.

According to a second aspect of the present disclosure, a device for capturing an image is provided. The device may include: a processor; and a memory configured to store instructions that are executable by the processor. The processor may be configured to perform: acquiring a current motion parameter of the terminal and a current ambient light parameter; setting a current exposure parameter of the terminal based on the current motion parameter of the terminal and the current ambient light parameter, where the current motion parameter may indicate a motion state of the terminal, the current ambient light parameter may indicate a current ambient light intensity, and the current exposure parameter may include a shutter value, an aperture value and a sensitivity; and capturing the image based on the set current exposure parameter of the terminal.

According to a third aspect of the present disclosure, a non-transitory computer readable storage medium is provided. The non-transitory computer readable storage medium has stored instructions. When the instructions are executed by a processor, the instructions may cause the processor to perform: acquiring a current motion parameter of the terminal and a current ambient light parameter; setting a current exposure parameter of the terminal based on the current motion parameter of the terminal and the current ambient light parameter, where the current motion parameter may indicate a motion state of the terminal, the current ambient light parameter may indicate a current ambient light intensity, and the current exposure parameter may include a shutter value, an aperture value and a sensitivity; and capturing the image based on the set current exposure parameter of the terminal.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the present disclosure.

DETAILED DESCRIPTION

To make the objectives, technical solutions and advantages of the present disclosure clearer, one or more examples of the present disclosure will be described in detail below with reference to the accompanying drawings.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if"

may be understood to mean "when" or "upon" or "in response to" depending on the context.

Before one or more examples of the present disclosure are explained and described in detail, application scenarios related to one or more examples of the present disclosure will be described first.

Sometimes, a photometry system is provided in the terminals. Through the photometry system, the terminals may measure a current ambient light parameter. Afterwards, the terminals may determine an exposure period required for capturing the images based on the light parameter measured by the photometry system. Based on the exposure period, the terminals may set the shutter value, the aperture value and the sensitivity correspondingly, and capture the images based on the set shutter value, the set aperture value and the set sensitivity.

Sometimes, one or more cameras are provided on terminals such as smart phones and tablet computers. Users are inclined to adopt the one or more cameras on the terminals to capture images more and more. In addition, with the development of image processing technologies and terminal hardware technologies, the users have higher and higher requirements for the quality of the images captured by the terminals through the one or more cameras. The level of the quality of the captured images is closely related to an exposure parameter of the terminal when the images are captured. When the user holds the terminal to capture the image, and both the user and the terminal are in a motion state, the captured image is easily blurred and has a poor quality. The method for capturing an image provided in one or more examples of the present disclosure may be applicable to the above application scenarios. That is, when the terminal captures the image during a motion, the exposure parameter may be set through the method for capturing an image provided in one or more examples of the present disclosure, the image may be captured based on the set exposure parameter, to avoid the problem that the captured image is blurred, which may be caused by the terminal being in the motion state.

Sometimes, the terminal may set the exposure parameter based on the light parameter measured by a photometry system. However, when the exposure parameter is simply set based on the light parameter, if a length of the set exposure period is longer and the terminal is in a motion state, it may result in blurred and poor-quality images. Based on this, one or more examples of the present disclosure provide a method for capturing an image, which minimizes the exposure period and ensures a sufficient amount of the incoming light, to improve the quality of the captured image.

Next, the method for capturing an image provided in one or more examples of the present disclosure will be described.

Figure 1:
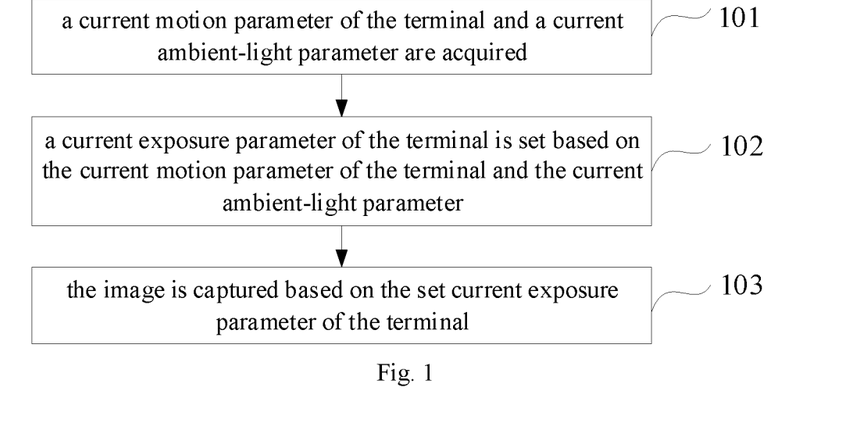
FIG. 1 is a flow chart illustrating a method for capturing an image according to an example of the present disclosure.

FIG. 1 is a flow chart illustrating a method for capturing an image according to an example of the present disclosure. As illustrated in FIG. 1, the method may be applicable to a terminal and include acts in the following blocks.

At block 101, a current motion parameter of the terminal and a current ambient light parameter are acquired.

At block 102, a current exposure parameter of the terminal is set based on the current motion parameter of the terminal and the current ambient light parameter.

The motion parameter is configured to indicate a motion state of the terminal. The light parameter is configured to indicate a current ambient light intensity. The exposure parameter includes a shutter value, an aperture value and a sensitivity.

At block 103, the image is captured based on the set current exposure parameter of the terminal.

In one or more examples of the present disclosure, the current motion parameter of the terminal and the current ambient light parameter may be acquired. Then, the terminal may set the current exposure parameter of the terminal based on the current motion parameter of the terminal and the current ambient light parameter and capture the image based on the set current exposure parameter. That is, with one or more examples of the present disclosure, when the exposure parameter is set, both the current ambient light parameter and the current motion parameter of the terminal are considered. In this way, the exposure parameter is set based on the motion parameter and the light parameter. Therefore, when the image is captured based on the set exposure parameter, the problem that the captured image is blurred when the terminal is in a motion state during capturing may be avoided well, thereby improving the quality of the image.

Alternatively or additionally, the motion parameter includes a rotational angular velocity and a motion acceleration. Setting the current exposure parameter of the terminal based on the current motion parameter of the terminal and the current ambient light parameter includes: setting the current exposure parameter of the terminal based on the rotational angular velocity, the motion acceleration and the current ambient light parameter.

Alternatively or additionally, setting the current exposure parameter of the terminal based on the rotational angular velocity, the motion acceleration and the current ambient light parameter includes: acquiring an exposure parameter corresponding to the current ambient light parameter from a stored corresponding relationship between light parameters and exposure parameters; searching a non-zero motion parameter from the rotational angular velocity and the motion acceleration; when the non-zero motion parameter is searched, setting the current exposure parameter of the terminal based on the exposure parameter corresponding to the current ambient light parameter and the searched motion parameter.

Alternatively or additionally, the exposure parameter corresponding to the current ambient light parameter includes a first shutter value, a first aperture value and a first sensitivity. Setting the current exposure parameter of the terminal based on the exposure parameter corresponding to the current ambient light parameter and the searched motion parameter includes: modifying the first shutter value, the first aperture value and the first sensitivity based on the searched motion parameter to acquire a second shutter value, a second aperture value and a second sensitivity; and setting the second shutter value, the second aperture value and the second sensitivity as the current exposure parameter of the terminal.

Alternatively or additionally, modifying the first shutter value, the first aperture value and the first sensitivity based on the searched motion parameter to acquire the second shutter value, the second aperture value and the second sensitivity includes: determining a numerical range in which the searched motion parameter is located, and determining a shutter difference value, an aperture difference value and a sensitivity difference value based on the numerical range; subtracting the shutter difference value from the first shutter value to acquire the second shutter value, subtracting the aperture difference value from the first aperture value to acquire the second aperture value and adding the sensitivity difference value to the first sensitivity to acquire the second sensitivity.

Alternatively or additionally, after searching the non-zero motion parameter from the rotational angular velocity and the motion acceleration, the method further includes, when the non-zero motion parameter is not searched, determining whether the current ambient light parameter is greater than a preset light parameter; when the current ambient light parameter is greater than the preset light parameter, increasing the first shutter value by a first preset value to acquire a third shutter value, decreasing the first sensitivity by a second preset value to acquire a third sensitivity; setting the third shutter value, the first aperture value and the third sensitivity as the current exposure parameter of the terminal.

Alternatively or additionally, setting the current exposure parameter of the terminal based on the rotational angular velocity, the motion acceleration and the current ambient light parameter includes: calculating a current motion factor of the terminal based on the rotational angular velocity and the motion acceleration; acquiring an exposure parameter corresponding to the current ambient light parameter and the current motion factor of the terminal from a stored corresponding relationship among motion factors, light parameters and exposure parameters; setting the acquired exposure parameter as the current exposure parameter of the terminal.

Alternatively or additionally, the motion parameter includes a motion velocity. Setting the current exposure parameter of the terminal based on the current motion parameter of the terminal and the current ambient light parameter includes: acquiring an exposure parameter corresponding to the current ambient light parameter from a stored corresponding relationship between light parameters and exposure parameters; and modifying the exposure parameter corresponding to the current ambient light parameter based on the motion velocity and setting the modified exposure parameter as the current exposure parameter of the terminal.

All of the alternative or additional technical solutions may be combined arbitrarily to form alternative examples of the present disclosure, which will not be described in detail in one or more examples of the present disclosure.

Figure 2:
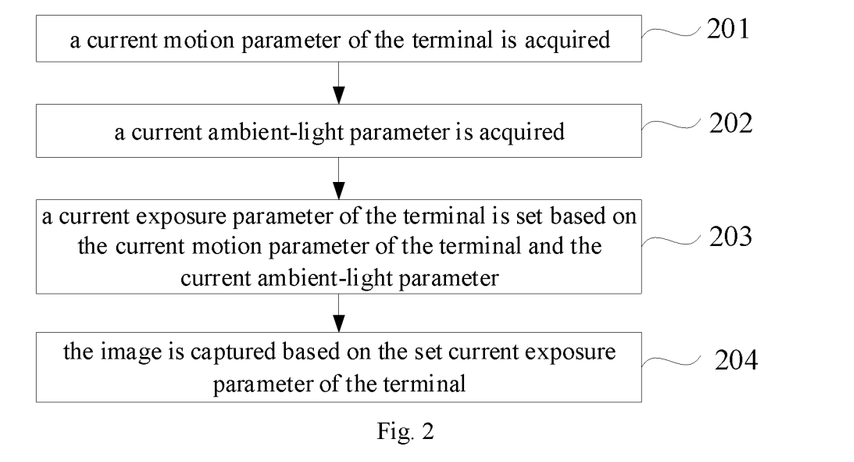
FIG. 2 is a flow chart illustrating another method for capturing an image according to an example of the present disclosure.

FIG. 2 is a flow chart illustrated a method for capturing an image according to an example of the present disclosure. The method may be applicable to a terminal. As illustrated in FIG. 2, the method may include acts in the following blocks.

At block 201, a current motion parameter of the terminal is acquired.

In one or more examples of the present disclosure, the user may click a camera application on the terminal to start the camera. After that, the user may trigger an image capturing instruction by triggering a capturing button. The terminal may detect in real time whether the image capturing instruction triggered by user is received. When the terminal detects the image capturing instruction, the current motion parameter may be acquired.

Alternatively or additionally, in one or more examples of the present disclosure, the terminal may also acquire the current motion parameter of the terminal when receiving a startup instruction of the camera application. The one or more examples of the present disclosure do not specifically limit this.

In one or more examples of the present disclosure, the terminal may be provided with a sensor such as a gyroscope or an accelerometer for measuring the motion parameter. Such sensor may detect the motion parameter of the terminal in real time. The motion parameter is configured to indicate a motion state of the terminal. For example, the gyroscope may detect a rotational angular velocity of the terminal in real time, and the accelerometer may detect a motion acceleration of the terminal in real time. The rotational angular velocity refers to a rotational acceleration of the terminal in a plane of the terminal, and the motion acceleration refers to an acceleration of the terminal in translation.

When the terminal acquires the motion parameter, the terminal may acquire the currently measured rotational angular velocity and motion acceleration. Certainly, when the terminal may also measure other motion parameters, other motion parameters may also be acquired accordingly. For example, when the terminal may also perform motion velocity detection through a built-in GPS (Global Positioning System) module or other installed applications, the terminal may acquire the measured current motion velocity of the terminal. In the next acts, one or more examples of the present disclosure will explain the motion parameters including the rotational angular velocity, the motion acceleration and the motion velocity as examples. For other motion parameters, it may refer to the relevant implementation to process.

At block 202, a current ambient light parameter is acquired.

Generally, an exposure parameter is closely related to a current ambient light intensity. When the current ambient light is bright, a sufficient amount of the incoming light may be ensured by using a shorter exposure period or a smaller aperture, so that the captured image is exposed normally. When the current ambient light is dark, the terminal may appropriately extend the exposure period or appropriately increase the aperture so as to ensure a sufficient amount of the incoming light to avoid underexposure. Based on this, the terminal needs to acquire the current ambient light parameter when setting the exposure parameter. The light parameter may be an illumination or brightness of the current ambient light. That is, the light parameter may be configured to indicate the current ambient light intensity.

The terminal may be provided with a sensor for measuring the ambient light. Through the sensor, the terminal may automatically detect the current ambient light parameter. In a possible situation, a photometry system may be disposed in the terminal. Through the photometry system, the terminal may also acquire the current ambient light parameter within the field of view of the camera.

In addition, it should also be noted that in one or more examples of the present disclosure, an execution sequence of acts in blocks 201 and 202 may be in any order. That is, when the image capturing instruction is detected, the current motion parameter of the terminal and the current ambient light parameter may be simultaneously acquired, or, the current ambient light parameter may be acquired and then the current motion parameter of the terminal may be acquired, which are not specifically limited in one or more examples of the present disclosure.

At block 203, a current exposure parameter of the terminal is set based on the current motion parameter of the terminal and the current ambient light parameter.

After the terminal acquires the current motion parameter and the current ambient light parameter, the current exposure parameter of the terminal may be set based on the current motion parameter and the current ambient light parameter. The exposure parameter may include a shutter value, an aperture value and a sensitivity.

It should be noted that a size of the shutter value may be configured to indicate a length of the exposure period. The larger the shutter value, the slower the shutter speed, the longer the shutter is open, i.e., the longer the exposure period. Conversely, the smaller the shutter value, the faster the shutter speed and the shorter the shutter is open, i.e., the shorter the exposure period.

A size of the aperture value may be configured to indicate a size of the aperture. In the case where a focal length does not change, the larger the aperture value, the smaller the aperture, and the smaller the amount of the incoming light. On the contrary, the smaller the aperture value, the larger the aperture, and the longer the amount of the incoming light.

A size of the sensitivity may be configured to indicate a sensitivity to light. The larger the sensitivity, the more sensitive to light. In a dark environment, the brightness of the image may be increased by increasing the sensitivity. However, increasing the sensitivity results in greater noise, i.e., the imaging quality of the image will drop dramatically.

In one or more examples of the present disclosure, setting the exposure parameter of the terminal is actually setting the shutter value, the aperture value and the sensitivity. From the foregoing description, the motion parameter may include the rotational angular velocity, the motion acceleration and the motion velocity. When the motion parameter includes the rotational angular velocity and the motion acceleration, the terminal may set the current exposure parameter of the terminal based on the acquired the rotational angular velocity, the acquired motion acceleration and the current ambient light parameter.

The terminal may set the exposure parameter based on the rotational angular velocity, the motion acceleration and the current ambient light parameter in the following two ways.

The first way: an exposure parameter corresponding to the current ambient light parameter is acquired from a stored corresponding relationship between light parameters and exposure parameters; a non-zero motion parameter is searched from the rotational angular velocity and the motion acceleration; when the non-zero motion parameter is searched, the current exposure parameter of the terminal is set based on the exposure parameter corresponding to the current ambient light parameter and the searched motion parameter.

Generally, the correspondence relationship between the light parameters and the exposure parameters is stored in the terminal. The correspondence relationship between the light parameters and the exposure parameters has the exposure parameters that should be set under different light parameters determined by the terminal in a static state. In one or more examples of the present disclosure, after acquiring the current ambient light parameter, the terminal may acquire the exposure parameter corresponding to the current ambient light parameter from the correspondence relationship. Then the terminal may further set the current exposure parameter of the terminal based on the acquired exposure parameter by combining with the current motion parameters of the terminal.

From the foregoing description, it may be seen that the exposure parameter includes three values, which are the shutter value, the aperture value and the sensitivity. Therefore, the exposure parameter corresponding to the current ambient light parameter acquired from the corresponding relationship between the light parameters and the exposure parameters may include a first shutter value, a first aperture value and a first sensitivity. Also, it should be noted that the correspondence relationship between the light parameters and the exposure parameters may be a correspondence relationship between light parameter ranges and the exposure parameters. In this case, the terminal may acquire the exposure parameter corresponding to a light parameter range where the current ambient light parameter is located.

After acquiring the exposure parameter corresponding to the current ambient light parameter, since the captured images under the same exposure parameter when the terminal is in the state motion and in the static state have different quality, the terminal may search the non-zero motion parameter from the rotational angular velocity and the motion parameter and determine whether the exposure parameter corresponding to the current ambient light parameter is needed to be modified based on the search result.

The specific implementation process of searching the non-zero motion parameter from the rotational angular velocity and the motion acceleration may be as follows. It is determined whether the rotational angular velocity is equal to 0 and whether the motion acceleration is equal to 0. When the rotational angular velocity is not equal to 0 and the motion acceleration is equal to 0, the non-zero motion parameter is obtained and the obtained non-zero motion parameter is the rotational angular velocity. When the rotational angular velocity is equal to 0 and the motion acceleration is not equal to 0, the non-zero motion parameter is obtained and the obtained non-zero motion parameter is the motion acceleration. When the rotational angular velocity is not equal to 0 and the motion acceleration is not equal to 0, the non-zero motion parameter is obtained and the obtained non-zero motion parameter includes the rotational angular velocity and the motion acceleration. When the rotational angular velocity and the motion acceleration both are equal to 0, the non-zero motion parameter is not obtained and it may be determined that the terminal is currently in the static state.

When the non-zero motion parameter is searched from the rotational angular velocity and the motion acceleration, it indicates that the terminal is currently in the motion state. At this time, the terminal may set the current exposure parameter of the terminal based on the searched non-zero motion parameter.

The first shutter value, the first aperture value and the first sensitivity may be modified by the terminal based on the searched motion parameter to acquire a second shutter value, a second aperture value and a second sensitivity; and the second shutter value, the second aperture value and the second sensitivity are set by the terminal as the current exposure parameter of the terminal.

Further, the operation of modifying the first shutter value, the first aperture value and the first sensitivity based on the searched motion parameter to acquire the second shutter value, the second aperture value and the second sensitivity may include the followings. A numerical range in which the searched motion parameter is located is determined. A shutter difference value, an aperture difference value and a sensitivity difference value are determined based on the numerical range. The shutter difference value is subtracted from the first shutter value to acquire the second shutter value. The aperture difference value is subtracted from the first aperture value to acquire the second aperture value. The sensitivity difference value is added to the first sensitivity to acquire the second sensitivity.

Based on the foregoing description, it may be seen that the searched non-zero motion parameter may be the rotational angular velocity, or be the motion acceleration, or include the rotational angular velocity and the motion acceleration. When the searched non-zero motion parameter is the rotational angular velocity, the terminal may determine an angular velocity range in which the rotational angular velocity is located. Afterwards, the terminal may acquire the shutter difference value, the aperture difference value and the sensitivity difference value corresponding to the angular velocity range in which the rotational angular velocity is located from a stored corresponding relationship among angular velocity ranges, shutter difference values, aperture difference values and sensitivity difference values.

When the searched non-zero motion parameter is the motion acceleration, the terminal may determine an acceleration range in which the motion acceleration is located. Afterwards, the terminal may acquire the shutter difference value, the aperture difference value and the sensitivity difference value corresponding to the acceleration range in which the motion acceleration is located from a stored corresponding relationship among acceleration ranges, shutter difference values, aperture difference values and sensitivity difference values.

When the searched non-zero motion parameter includes the rotational angular velocity and the motion acceleration, the terminal may determine an angular velocity range in which the rotational angular velocity is located and an acceleration range in which the motion acceleration is located. Afterwards, the terminal may acquire a first shutter difference value, a first aperture difference value and a first sensitivity difference value corresponding to the angular velocity range in which the rotational angular velocity is located from a stored corresponding relationship among angular velocity ranges, shutter difference values, aperture difference values and sensitivity difference values, and acquire a second shutter difference value, a second aperture difference value and a second sensitivity difference value corresponding to the acceleration range in which the motion acceleration is located from a stored corresponding relationship among acceleration ranges, shutter difference values, aperture difference values and sensitivity difference values. Then, the terminal may determine a rotational weight corresponding to the rotational angular velocity and a motion weight corresponding to the motion acceleration based on the rotational angular velocity and the motion acceleration, calculate a product of the rotational weight and the first shutter difference value, calculate a product of the motion weight and the second shutter difference value, and calculate a sum of the calculated two products to get the final shutter difference value. For the aperture difference value and the sensitivity difference value, the terminal may determine accordingly based on the rotation weight and the motion weight by using the above method.

Alternatively or additionally, in a possible implementation manner, the first shutter difference value, the first aperture difference value and the first sensitivity difference value are acquired according to the rotational angular velocity, and the second shutter difference value, the second aperture difference value and the second sensitivity difference value are acquired. Then, the terminal may select a larger one of the first shutter difference value and the second shutter difference value as the shutter difference value, and a larger one of the first aperture difference value and the second aperture difference value as the aperture difference value, and a larger one of the first sensitivity difference value and the second sensitivity difference value as the sensitivity difference value.

After determining the shutter difference value, the aperture difference value and the sensitivity difference, the terminal may subtract the shutter difference value from the first shutter value to acquire the second shutter value because the second shutter value is smaller than the first shutter value, and the first shutter value is a shutter value corresponding to the ambient light parameter when the terminal is in the static state. Therefore, it is equivalent to the terminal reducing the shutter value when the terminal is in the motion state. In this way, when the image is captured when the terminal is currently in the motion state, since the shutter value is reduced relative to the shutter value at the static state, the exposure period is shortened accordingly, so that the problem of the blurring image is effectively alleviated.

When the first shutter value is decreased to acquire the second shutter value, the exposure period is shortened due to decreasing of the shutter value, and the amount of the incoming light is also reduced accordingly. To ensure the quality of the captured image, the terminal may accordingly decrease the aperture value and increase the sensitivity to increase the amount of the incoming light to ensure the exposure is adequate.

It should be noted that in one or more examples of the present disclosure, the correspondence relationship among the angular velocity ranges, the shutter difference values, the aperture difference values and the sensitivity difference values, and the correspondence relationship among the acceleration ranges, the shutter difference values, the aperture difference values and the sensitivity difference values may be predetermined and stored by the terminal. The terminal may determine the above corresponding relationships based on pre-measured experimental values. The pre-measured experimental values refer to a plurality of sets of optimal exposure parameters measured when the terminal performs image capturing under different light parameters and motion parameters.

Alternatively or additionally, when the terminal does not search the non-zero motion parameter from the rotational angular velocity and the motion acceleration, it indicates that the terminal is currently in the static state. In this case, the terminal may directly set the acquired exposure parameter corresponding to the current ambient light parameter as the exposure parameter of the terminal. Further, due to in the correspondence relationship stored in the terminal between the light parameters and the exposure parameters, the exposure parameter is generally a value of the average level. That is, the exposure parameter is only a value given in consideration of sufficient exposure. Therefore, when the current ambient light is sufficient, the terminal may further reduce the sensitivity without affecting the exposure, thereby improving the quality of the image.

The terminal may determine whether the current ambient light parameter is greater than a preset light parameter; when the current ambient light parameter is greater than the preset light parameter, increases the first shutter value by a first preset value to acquire a third shutter value and decreases the first sensitivity by a second preset value to acquire a third sensitivity; and sets the third shutter value, the first aperture value and the third sensitivity as the current exposure parameter of the terminal.

It should be noted that the preset light parameter may be a light parameter when the light is sufficient. When the current ambient light parameter is greater than the preset light parameter, it indicates that the current ambient light may be sufficient. In this case, the terminal may accordingly reduce the first sensitivity corresponding to the current ambient light parameter to acquire the third sensitivity. As the sensitivity is reduced, the quality of the captured image will be correspondingly improved. Further, to keep the brightness of the image captured after the sensitivity is reduced, by taking into account that the terminal is currently in the static state, the extended exposure period does not cause the blurring image, and the terminal may increase the shutter value accordingly to increase the amount of the incoming light.

The second way: a current motion factor of the terminal is calculated based on the rotational angular velocity and the motion acceleration; an exposure parameter corresponding to the current ambient light parameter and the current motion factor of the terminal is acquired from a stored corresponding relationship among motion factors, light parameters and exposure parameters; and the acquired exposure parameter is set as the current exposure parameter of the terminal.

In this implementation, the terminal may calculate the current motion factor of the terminal based on the rotational angular velocity and the motion acceleration after acquiring the rotational angular velocity and the motion acceleration. The terminal may acquire a preset rotation weight and a preset motion weight. After that, the terminal may calculate a product of the rotation weight and the rotational angular velocity and a product of the motion weight and the motion acceleration, and add the two calculated products to acquire the current motion factor of the terminal. The rotation weight and the motion weight may be determined by the terminal in advance according to influence of the rotation angular velocity and the motion acceleration on the quality of the captured image, and a sum of the rotation weight and the motion weight may be 1.

After determining the current motion factor of the terminal, the terminal may acquire the exposure parameter corresponding to the current ambient light parameter from a stored corresponding relationship among the motion factors, the light parameters and the exposure parameters and set the acquired exposure parameter as the current exposure parameter of the terminal. The stored corresponding relationship among the motion factors, the light parameters and the exposure parameters may be determined by the terminal in advance according to a plurality of experimental values. The plurality of experimental values may be a plurality of sets of experimental parameters acquired after the terminal experimentally measures the optimal exposure parameters under different rotational angular velocities and different light parameters and under different motion accelerations and different light parameters.

Alternatively or additionally, the motion parameter includes a motion velocity. An exposure parameter corresponding to the current ambient light parameter is acquired from a stored corresponding relationship between light parameters and exposure parameters. Then, the exposure parameter corresponding to the current ambient light parameter is modified based on the motion velocity and the modified exposure parameter is set as the current exposure parameter of the terminal.

The specific implementation manner of acquiring by the terminal the exposure parameter corresponding to the current ambient light parameter from the stored corresponding relationship between the light parameters and the exposure parameters may refer to the related implementation manners of the foregoing acts, which are not described herein again in one or more examples of the present disclosure.

When the terminal acquires the exposure parameter corresponding to the current ambient light parameter, the terminal may determine a numerical range in which the acquired motion parameter, and determine a shutter difference value, an aperture difference value and a sensitivity difference value based on the numerical range; then subtract the shutter difference value from the shutter value in the acquired exposure parameter to acquire a current shutter value, subtract the aperture difference value from the aperture value in the acquired exposure parameter to acquire a current aperture value and add the sensitivity difference value to the sensitivity in the acquired exposure parameter to acquire a current sensitivity.

It should be further noted that the motion parameter may also include the rotational angular velocity, the motion acceleration and the motion velocity. In this case, when all of the rotational angular velocity, the motion acceleration and the motion velocity are not equal to 0 (i.e., none of the three is equal to 0), the terminal may determine the current exposure parameter of the terminal based on the motion velocity and the current ambient light parameter, or, the terminal may determine the final exposure parameter by calculating the motion factor through the three motion parameters according to the method described in the second manner above. When any two of the three are not equal to 0, for example, when the motion acceleration and the motion velocity are not equal to 0, or, when the rotational angular velocity and the motion velocity are not equal to 0, the terminal may determine the final exposure parameter by calculating the motion factor according to the method described in the second manner above. When only the motion velocity is not equal to 0, the terminal may determine the current exposure parameter of the terminal based on the motion velocity and the current ambient light parameter.

At block 204, the image is captured based on the set current exposure parameter of the terminal.

After the current exposure parameter of the terminal is set through any of the above two manners, the terminal may perform image capturing according to the exposure parameter.

In one or more examples of the present disclosure, the current motion parameter of the terminal and the current ambient light parameter may be acquired. Then, the terminal may set the current exposure parameter of the terminal based on the current motion parameter of the terminal and the current ambient light parameter and capture the image based on the set current exposure parameter. That is, with one or more examples of the present disclosure, when the exposure parameter is set, both the current ambient light parameter and the current motion parameter of the terminal are considered. In this way, the exposure parameter is set based on the motion parameter and the light parameter. Therefore, when the image is captured based on the set exposure parameter, the problem that the captured image is blurred when the terminal is in a motion state during capturing may be avoided well, thereby improving the quality of the image.

In addition, in one or more examples of the present disclosure, when the terminal is in the static state, after the terminal acquires the exposure parameter corresponding to the current ambient light parameter, the terminal may further decrease the sensitivity in the acquired exposure parameter and increase the shutter value in the acquired exposure parameter based on the current ambient light parameter. Therefore, the quality of the image may be further improved while sufficient exposure is ensured.

Figure 3A:
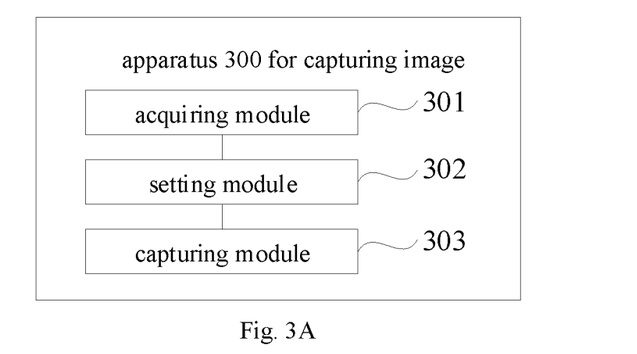
FIG. 3A is a block diagram illustrating an apparatus for capturing an image according to an example of the present disclosure.

FIG. 3A is a block diagram illustrating an apparatus for capturing an image according to an example of the present disclosure. As illustrated in FIG. 3A, the apparatus may include an acquiring module 301, a setting module 302 and a capturing module 303.

The acquiring module 301 is configured to acquire a current motion parameter of the terminal and a current ambient light parameter.

The setting module 302 is configured to set a current exposure parameter of the terminal based on the current motion parameter of the terminal and the current ambient light parameter. The motion parameter is configured to indicate a motion state of the terminal. The light parameter is configured to indicate a current ambient light intensity. The exposure parameter includes a shutter value, an aperture value and a sensitivity.

The capturing module 303 is configured to capture the image based on the set current exposure parameter of the terminal.

Alternatively or additionally, the motion parameter includes a rotational angular velocity and a motion acceleration.

The setting module 302 includes a first setting unit 3021.

The first setting unit 3021 is configured to set the current exposure parameter of the terminal based on the rotational angular velocity, the motion acceleration and the current ambient light parameter.

Figure 3B:
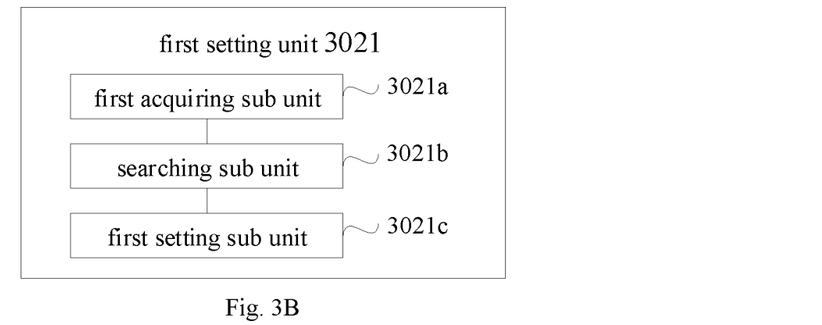
FIG. 3B is a block diagram illustrating a first setting unit according to an example of the present disclosure.

Alternatively or additionally, as illustrated in FIG. 3B, the first setting unit 3021 includes a first acquiring sub unit 3021a, a searching sub unit 3021b and a first setting sub unit 3021c.

The first acquiring sub unit 3021a is configured to acquire an exposure parameter corresponding to the current ambient light parameter from a stored corresponding relationship between light parameters and exposure parameters.

The searching sub unit 3021b is configured to search a non-zero motion parameter from the rotational angular velocity and the motion acceleration.

The first setting sub unit 3021c is configured to, when the non-zero motion parameter is searched, set the current exposure parameter of the terminal based on the exposure parameter corresponding to the current ambient light parameter and the searched motion parameter.

Alternatively or additionally, the exposure parameter corresponding to the current ambient light parameter includes a first shutter value, a first aperture value and a first sensitivity.

The first setting sub unit 3021c is configured to: modify the first shutter value, the first aperture value and the first sensitivity based on the searched motion parameter to acquire a second shutter value, a second aperture value and a second sensitivity; and set the second shutter value, the second aperture value and the second sensitivity as the current exposure parameter of the terminal.

Alternatively or additionally, the first setting sub unit 3021c is configured to: determine a numerical range in which the searched motion parameter is located, and determine a shutter difference value, an aperture difference value and a sensitivity difference value based on the numerical range; subtract the shutter difference value from the first shutter value to acquire the second shutter value, subtract the aperture difference value from the first aperture value to acquire the second aperture value and add the sensitivity difference value to the first sensitivity to acquire the second sensitivity.

Figure 3C:
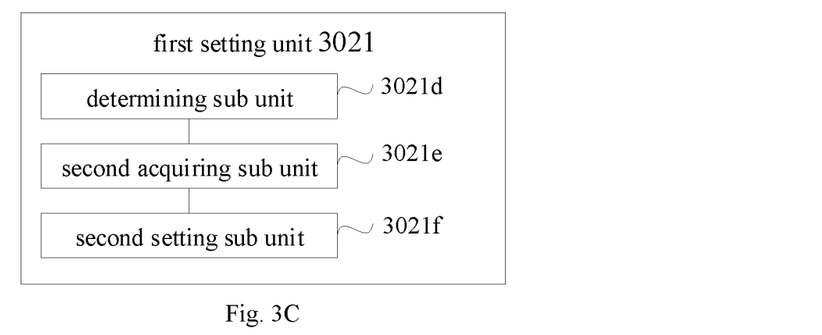
FIG. 3C is a block diagram illustrating another first setting unit according to an example of the present disclosure.

Alternatively or additionally, as illustrated in FIG. 3C, the first setting unit 3021 further includes a determining sub unit 3021d, a second acquiring sub unit 3021e and a second setting sub unit 3021f.

The determining sub unit 3021d is configured to, when the non-zero motion parameter is not searched, determine whether the current ambient light parameter is greater than a preset light parameter.

The second acquiring sub unit 3021e is configured to, when the current ambient light parameter is greater than the preset light parameter, increase the first shutter value by a first preset value to acquire a third shutter value, decreasing the first sensitivity by a second preset value to acquire a third sensitivity.

The second setting sub unit 3021f is configured to set the third shutter value, the first aperture value and the third sensitivity as the current exposure parameter of the terminal.

Alternatively or additionally, the first setting unit 3021 is configured to: calculate a current motion factor of the terminal based on the rotational angular velocity and the motion acceleration; acquire an exposure parameter corresponding to the current ambient light parameter and the current motion factor of the terminal from a stored corresponding relationship among motion factors, light parameters and exposure parameters; set the acquired exposure parameter as the current exposure parameter of the terminal.

Alternatively or additionally, the motion parameter includes a motion velocity.

The setting module 302 includes: an acquiring module and a second setting unit.

The acquiring module is configured to acquire an exposure parameter corresponding to the current ambient light parameter from a stored corresponding relationship between light parameters and exposure parameters.

The second setting unit is configured to modify the exposure parameter corresponding to the current ambient light parameter based on the motion velocity and to set the modified exposure parameter as the current exposure parameter of the terminal.

In one or more examples of the present disclosure, the current motion parameter of the terminal and the current ambient light parameter may be acquired. Then, the terminal may set the current exposure parameter of the terminal based on the current motion parameter of the terminal and the current ambient light parameter and capture the image based on the set current exposure parameter. That is, with one or more examples of the present disclosure, when the exposure parameter is set, both the current ambient light parameter and the current motion parameter of the terminal are considered. In this way, the exposure parameter is set based on the motion parameter and the light parameter. Therefore, when the image is captured based on the set exposure parameter, the problem that the captured image is blurred when the terminal is in a motion state during capturing may be avoided well, thereby improving the quality of the image.

Detailed implementations of functions and actions of above units in the above devices may be referred to those implementations of blocks in above methods, which are not elaborated herein.

Figure 4:
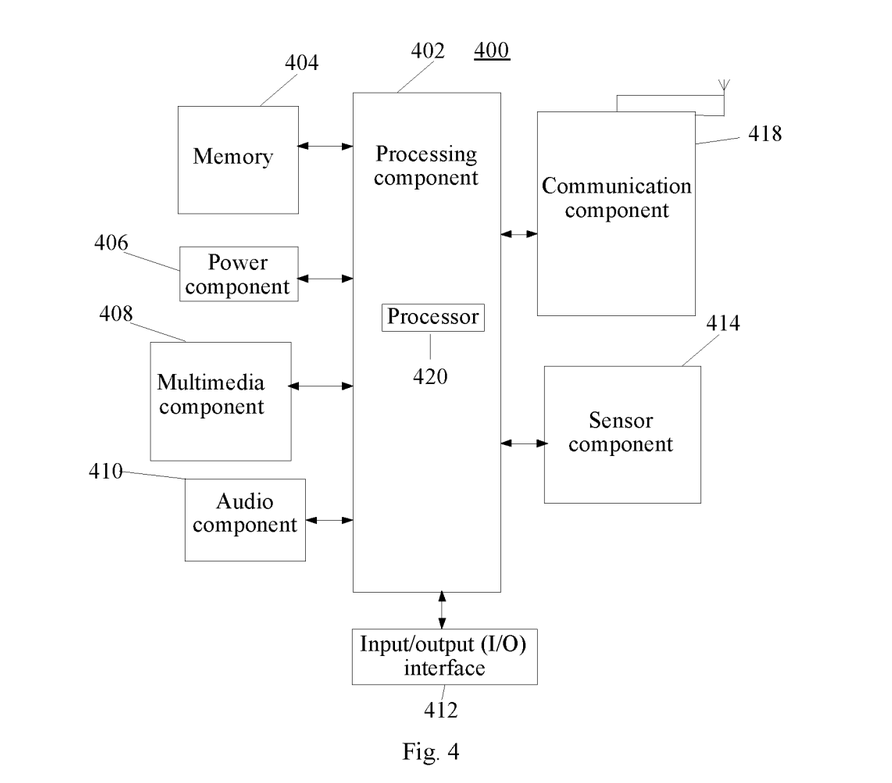
FIG. 4 is a block diagram illustrating a device for capturing an image according to an example of the present disclosure.

FIG. 4 is a block diagram illustrating a device 400 for capturing an image according to an example of the present disclosure. For example, the device 400 may be a mobile phone, a computer, a digital broadcasting terminal, a message sending and receiving equipment, a game controller, a tablet device, a medical device, a fitness equipment, a personal digital assistant or the like.

Referring to FIG. 4, the device 400 may include one or more of the following components: a processing component 402, a memory 404, a power component 406, a multimedia component 408, an audio component 410, an input/output (I/O) interface 412, a sensor component 414, and a communication component 416.

The processing component 402 typically controls overall operations of the device 400, such as the operations associated with display, telephone calls, data communications, camera operations, and recording operations. The processing component 402 may include one or more processors 420 to execute instructions to perform all or part of the steps in the above described methods. Moreover, the processing component 402 may include one or more modules which facilitate the interaction between the processing component 402 and other components. For instance, the processing component 402 may include a multimedia module to facilitate the interaction between the multimedia component 408 and the processing component 402.

The memory 404 is configured to store various types of data to support the operation of the device 400. Examples of such data include instructions for any applications or methods operated on the device 400, contact data, phonebook data, messages, pictures, video, etc. The memory 404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 406 provides power to various components of the device 400. The power component 406 may include a power management system, one or more power sources, and any other components associated with the generation, management, and distribution of power in the device 400.

The multimedia component 408 includes a screen providing an output interface between the device 400 and the user. In some examples, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some examples, the multimedia component 408 includes a front camera and/or a rear camera. The front camera and the rear camera may receive an external multimedia datum while the device 400 is in an operation mode, such as a photographing mode or a video mode. Each of the front camera and the rear camera may be a fixed optical lens system or have focus and optical zoom capability.

The audio component 410 is configured to output and/or input audio signals. For example, the audio component 410 includes a microphone ("MIC") configured to receive an external audio signal when the device 400 is in an operation mode, such as a call mode, a recording mode, and a voice recognition mode. The received audio signal may be further stored in the memory 404 or transmitted via the communication component 416. In some examples, the audio component 410 further includes a speaker to output audio signals.

The I/O interface 412 provides an interface between the processing component 402 and peripheral interface modules, such as a keyboard, a click wheel, buttons, and the like. The buttons may include, but are not limited to, a home button, a volume button, a starting button, and a locking button.

The sensor component 414 includes one or more sensors to provide status assessments of various aspects of the device 400. For instance, the sensor component 414 may detect an open/closed status of the device 400, relative positioning of components, e.g., the display and the keypad, of the device 400, a change in position of the device 400 or a component of the device 400, a presence or absence of user contact with the device 400, an orientation or an acceleration/deceleration of the device 400, and a change in temperature of the device 400. The sensor component 414 may include a proximity sensor configured to detect the presence of nearby objects without any physical contact. The sensor component 414 may also include a light sensor, such as a CMOS or CCD image sensor, for use in imaging applications. In some examples, the sensor component 414 may also include an accelerometer sensor, a gyroscope sensor, a magnetic sensor, a pressure sensor, or a temperature sensor.

The communication component 416 is configured to facilitate communication, wired or wirelessly, between the device 400 and other devices. The device 400 can access a wireless network based on a communication standard, such as Wi-Fi, 2G, or 3G, or a combination thereof. In one example, the communication component 416 receives a broadcast signal or broadcast associated information from an external broadcast management system via a broadcast channel. In one example, the communication component 416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In one or more examples, the device 400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In one or more examples, there is also provided a non-transitory computer-readable storage medium including instructions, such as included in the memory 404, executable by the processor 420 in the device 400, for performing the above-described methods. For example, the non-transitory computer-readable storage medium may be a ROM, a RAM, a CD-ROM, a magnetic tape, a floppy disc, an optical data storage device, and the like.

A non-transitory computer-readable storage medium has stored therein instructions that, when executed by a processor of a mobile terminal, may cause the mobile terminal to perform a method for capturing an image according to examples illustrated in FIG. 1 and FIG. 2.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors.

Other examples of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only.

It will be appreciated that the present disclosure is not limited to the exact construction that has been described above and illustrated in the accompanying drawings, and that various modifications and changes can be made without departing from the scope thereof.

What is claimed is:

1. A method for capturing an image that is applicable to a terminal, comprising:
    acquiring a current motion parameter of the terminal and a current ambient light parameter;
    setting a current exposure parameter of the terminal based on the current motion parameter of the terminal and the current ambient light parameter, wherein the current motion parameter indicates a motion state of the terminal, the current ambient light parameter indicates a current ambient light intensity, and the current exposure parameter comprises a shutter value, an aperture value and a sensitivity;
    acquiring an exposure parameter corresponding to the current ambient light parameter, the exposure parameter corresponding to the current ambient light parameter comprises a first shutter value, a first aperture value and a first sensitivity; and
    capturing the image based on the set current exposure parameter of the terminal;
    wherein setting the current exposure parameter of the terminal based on the current motion parameter of the terminal and the current ambient light parameter comprises:
    determining a numerical range in which the motion parameter is located, and determining a shutter difference value, an aperture difference value and a sensitivity difference value based on the numerical range;
    subtracting the shutter difference value from the first shutter value to obtain a second shutter value, subtracting the aperture difference value from the first aperture value to obtain a second aperture value and adding the sensitivity difference value to the first sensitivity to obtain a second sensitivity.

2. The method according to claim 1, wherein:
    the current motion parameter comprises a rotational angular velocity and a motion acceleration, and
    setting the current exposure parameter of the terminal based on the current motion parameter of the terminal and the current ambient light parameter comprises:
    setting the current exposure parameter of the terminal based on the rotational angular velocity, the motion acceleration and the current ambient light parameter.

3. The method according to claim 2, wherein setting the current exposure parameter of the terminal based on the rotational angular velocity, the motion acceleration and the current ambient light parameter comprises:
    acquiring the exposure parameter corresponding to the current ambient light parameter from a stored corresponding relationship between light parameters and exposure parameters;
    searching a non-zero motion parameter from the rotational angular velocity and the motion acceleration;
    when the non-zero motion parameter is obtained, setting the current exposure parameter of the terminal based on the exposure parameter corresponding to the current ambient light parameter and the searched motion parameter.

4. The method according to claim 1, wherein the method further comprises:
    setting the second shutter value, the second aperture value and the second sensitivity as the current exposure parameter of the terminal.

5. The method according to claim 3, after searching the non-zero motion parameter from the rotational angular velocity and the motion acceleration, further comprising:
    when the non-zero motion parameter is not obtained, determining whether the current ambient light parameter is greater than a preset light parameter;
    when the current ambient light parameter is greater than the preset light parameter, increasing the first shutter value by a first preset value to obtain a third shutter value, decreasing the first sensitivity by a second preset value to obtain a third sensitivity;
    setting the third shutter value, the first aperture value and the third sensitivity as the current exposure parameter of the terminal.

6. The method according to claim 2, wherein setting the current exposure parameter of the terminal based on the rotational angular velocity, the motion acceleration and the current ambient light parameter further comprises:
    calculating a current motion factor of the terminal based on the rotational angular velocity and the motion acceleration;
    acquiring an exposure parameter corresponding to the current ambient light parameter and the current motion factor of the terminal from a stored corresponding relationship among motion factors, light parameters and exposure parameters; and
    setting the acquired exposure parameter as the current exposure parameter of the terminal.

7. The method according to claim 1, wherein:
    the current motion parameter comprises a motion velocity, and
    setting the current exposure parameter of the terminal based on the current motion parameter of the terminal and the current ambient light parameter comprises:
    acquiring the exposure parameter corresponding to the current ambient light parameter from a stored corresponding relationship between light parameters and exposure parameters; and
    modifying the exposure parameter corresponding to the current ambient light parameter based on the motion velocity and setting the modified exposure parameter as the current exposure parameter of the terminal.

8. A device for capturing an image, comprising:
    a processor; and
    a memory configured to store instructions that are executable by the processor;
    wherein the processor is configured to perform:
    acquiring a current motion parameter of a terminal and a current ambient light parameter;
    setting a current exposure parameter of the terminal based on the current motion parameter of the terminal and the current ambient light parameter, wherein the current motion parameter indicates a motion state of the terminal, the current ambient light parameter indicates a current ambient light intensity, and the current exposure parameter comprises a shutter value, an aperture value and a sensitivity;
    acquiring an exposure parameter corresponding to the current ambient light parameter, the exposure parameter corresponding to the current ambient light parameter comprises a first shutter value, a first aperture value and a first sensitivity; and capturing the image based on the set current exposure parameter of the terminal;

wherein the processor configured to perform setting the current exposure parameter of the terminal based on the current motion parameter of the terminal and the current ambient light parameter is further configured to perform:

determining a numerical range in which the motion parameter is located, and determining a shutter difference value, an aperture difference value and a sensitivity difference value based on the numerical range;

subtracting the shutter difference value from the first shutter value to obtain a second shutter value, subtracting the aperture difference value from the first aperture value to obtain a second aperture value and adding the sensitivity difference value to the first sensitivity to obtain a second sensitivity.

9. The device according to claim 8, wherein:

the current motion parameter comprises a rotational angular velocity and a motion acceleration, and the processor configured to perform setting the current exposure parameter of the terminal based on the current motion parameter of the terminal and the current ambient light parameter is further configured to perform;

setting the current exposure parameter of the terminal based on the rotational angular velocity, the motion acceleration and the current ambient light parameter.

10. The device according to claim 9, wherein the processor configured to perform setting the current exposure parameter of the terminal based on the rotational angular velocity, the motion acceleration and the current ambient light parameter is further configured to perform:

acquiring the exposure parameter corresponding to the current ambient light parameter from a stored corresponding relationship between light parameters and exposure parameters;

searching a non-zero motion parameter from the rotational angular velocity and the motion acceleration;

when the non-zero motion parameter is obtained, setting the current exposure parameter of the terminal based on the exposure parameter corresponding to the current ambient light parameter and the searched motion parameter.

11. The device according to claim 10, wherein the processor is further configured to perform:

setting the second shutter value, the second aperture value and the second sensitivity as the current exposure parameter of the terminal.

12. The device according to claim 10, wherein the processor is further configured to perform:

when the non-zero motion parameter is not obtained, determining whether the current ambient light parameter is greater than a preset light parameter;

when the current ambient light parameter is greater than the preset light parameter, increasing the first shutter value by a first preset value to obtain a third shutter value, decreasing the first sensitivity by a second preset value to obtain a third sensitivity;

setting the third shutter value, the first aperture value and the third sensitivity as the current exposure parameter of the terminal.

13. The device according to claim 9, wherein the processor configured to perform setting the current exposure parameter of the terminal based on the rotational angular velocity, the motion acceleration and the current ambient light parameter is further configured to perform:

calculating a current motion factor of the terminal based on the rotational angular velocity and the motion acceleration;

acquiring an exposure parameter corresponding to the current ambient light parameter and the current motion factor of the terminal from a stored corresponding relationship among motion factors, light parameters and exposure parameters; and setting the acquired exposure parameter as the current exposure parameter of the terminal.

14. The device according to claim 8, wherein:

the current motion parameter comprises a motion velocity, and the processor configured to perform setting the current exposure parameter of the terminal based on the current motion parameter of the terminal and the current ambient light parameter is further configured to perform;

acquiring the exposure parameter corresponding to the current ambient light parameter from a stored corresponding relationship between light parameters and exposure parameters; and modifying the exposure parameter corresponding to the current ambient light parameter based on the motion velocity and setting the modified exposure parameter as the current exposure parameter of the terminal.

15. A non-transitory computer readable storage medium having stored therein instructions that, when executed by a processor, cause the processor to perform:

acquiring a current motion parameter of a terminal and a current ambient light parameter;

setting a current exposure parameter of the terminal based on the current motion parameter of the terminal and the current ambient light parameter, wherein the current motion parameter indicates a motion state of the terminal, the current ambient light parameter indicates a current ambient light intensity, and the current exposure parameter comprises a shutter value, an aperture value and a sensitivity;

acquiring an exposure parameter corresponding to the current ambient light parameter, the exposure parameter corresponding to the current ambient light parameter comprises a first shutter value, a first aperture value and a first sensitivity;

capturing an image based on the set current exposure parameter of the terminal;

wherein the instructions causing the processor to perform setting the current exposure parameter of the terminal based on the current motion parameter of the terminal and the current ambient light parameter further cause the processor to perform;

determining a numerical range in which the motion parameter is located, and determining a shutter difference value, an aperture difference value and a sensitivity difference value based on the numerical range;

subtracting the shutter difference value from the first shutter value to obtain a second shutter value, subtracting the aperture difference value from the first aperture value to obtain a second aperture value and adding the sensitivity difference value to the first sensitivity to obtain a second sensitivity.

16. The non-transitory computer readable storage medium according to claim 15, wherein:

the motion current parameter comprises a rotational angular velocity and a motion acceleration, and the instructions causing the processor to perform setting the current exposure parameter of the terminal based on the current motion parameter of the terminal and the current ambient light parameter further cause the processor to perform;
setting the current exposure parameter of the terminal based on the rotational angular velocity, the motion acceleration and the current ambient light parameter.

17. The non-transitory computer readable storage medium according to claim 16, wherein the instructions causing the processor to perform setting the current exposure parameter of the terminal based on the rotational angular velocity, the motion acceleration and the current ambient light parameter further cause the processor to perform:
acquiring an exposure parameter corresponding to the current ambient light parameter from a stored corresponding relationship between light parameters and exposure parameters;
searching a non-zero motion parameter from the rotational angular velocity and the motion acceleration;
when the non-zero motion parameter is obtained, setting the current exposure parameter of the terminal based on the exposure parameter corresponding to the current ambient light parameter and the searched motion parameter.

18. The non-transitory computer readable storage medium according to claim 15, wherein the instructions causing the processor to perform setting the current exposure parameter of the terminal based on the rotational angular velocity, the motion acceleration and the current ambient light parameter further cause the processor to perform:
calculating a current motion factor of the terminal based on the rotational angular velocity and the motion acceleration;
acquiring the exposure parameter corresponding to the current ambient light parameter and the current motion factor of the terminal from a stored corresponding relationship among motion factors, light parameters and exposure parameters;
setting the acquired exposure parameter as the current exposure parameter of the terminal.

19. The method according to claim 3, wherein searching the non-zero motion parameter from the rotational angular velocity and the motion acceleration comprises:
determining whether the rotational angular velocity is equal to 0 and whether the motion acceleration is equal to 0;
when at least one of the rotational angular velocity and the motion acceleration is not equal to 0, determining that the non-zero motion parameter is searched.

20. The method according to claim 6, wherein calculating the current motion factor of the terminal based on the rotational angular velocity and the motion acceleration comprises:
acquiring a preset rotation weight and a preset motion weight;
calculating a product of the preset rotation weight and the rotational angular velocity and a product of the preset motion weight and the motion acceleration, and
adding the two calculated products to acquire the current motion factor of the terminal.

* * * * *